(12) United States Patent
Heap et al.

(10) Patent No.: US 8,788,164 B2
(45) Date of Patent: Jul. 22, 2014

(54) METHOD AND APPARATUS FOR CONTROLLING A MULTI-MODE POWERTRAIN SYSTEM

(71) Applicant: GM Global Technology Operations LLC, Detroit, MI (US)

(72) Inventors: Anthony H. Heap, Ann Arbor, MI (US); Kee Yong Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/681,507

(22) Filed: Nov. 20, 2012

(65) Prior Publication Data

US 2014/0142821 A1    May 22, 2014

(51) Int. Cl.
 *G06F 7/00* (2006.01)
 *G06F 17/00* (2006.01)

(52) U.S. Cl.
 USPC .......................................................... 701/54

(58) Field of Classification Search
 USPC .......................................................... 701/54
 See application file for complete search history.

(56) References Cited

U.S. PATENT DOCUMENTS

| | | | | |
|---|---|---|---|---|
| 5,152,191 A | * | 10/1992 | Sato et al. ..................... | 477/36 |
| 5,406,483 A | * | 4/1995 | Kallis et al. ..................... | 701/53 |
| 5,526,261 A | * | 6/1996 | Kallis et al. ..................... | 701/51 |
| 5,681,242 A | * | 10/1997 | Bates .............................. | 477/180 |
| 6,023,650 A | * | 2/2000 | Yamamoto et al. ............. | 701/82 |
| 6,070,680 A | * | 6/2000 | Oyama ........................ | 180/65.25 |
| 7,645,206 B2 | | 1/2010 | Holmes et al. | |
| 2008/0071449 A1 | * | 3/2008 | Kondo et al. .................... | 701/51 |
| 2010/0179009 A1 | | 7/2010 | Wittkopp et al. | |

OTHER PUBLICATIONS

U.S. Appl. No. 13/569,929, Diaz, et al., unpubl.
U.S. Appl. No. 13/568,086, Heap, et al., unpubl.
U.S. Appl. No. 13/568,070, Heap, et al., unpubl.
U.S. Appl. No. 13/571,070, Heap, et al., unpubl.
U.S. Appl. No. 13/568,071, Kim, et al., unpubl.
U.S. Appl. No. 13/568,083, Heap, et al., unpubl.
U.S. Appl. No. 13/570,175, Ladao, et al., unpubl.

* cited by examiner

*Primary Examiner* — Mary Cheung
*Assistant Examiner* — Frederick Brushaber (57) ABSTRACT

A powertrain system includes an internal combustion engine, a multi-mode transmission, torque machines, and a driveline. A method for operating the powertrain system to transfer torque among the engine, torque machine, and driveline includes controlling operation of the powertrain system in a pseudo-gear range in response to an output torque request including operating the transmission in a variable mode transmission range and controlling a magnitude of torque output to the driveline in response to an output torque request and in proportion to a magnitude of input torque from the engine.

4 Claims, 4 Drawing Sheets

METHOD AND APPARATUS FOR CONTROLLING A MULTI-MODE POWERTRAIN SYSTEM

TECHNICAL FIELD

This disclosure is related to dynamic system controls for multi-mode powertrain systems employing multiple torque-generative devices.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes an internal combustion engine, a multi-mode transmission, torque machines, and a driveline. A method for operating the powertrain system to transfer torque among the engine, torque machine, and driveline includes controlling operation of the powertrain system in a pseudo-gear range in response to an output torque request including operating the transmission in a variable mode transmission range and controlling a magnitude of torque output to the driveline in response to an output torque request and in proportion to a magnitude of input torque from the engine.

BRIEF DESCRIPTION OF THE DRAWINGS

One or more embodiments will now be described, by way of example, with reference to the accompanying drawings, in which.

DETAILED DESCRIPTION

Figure 1:
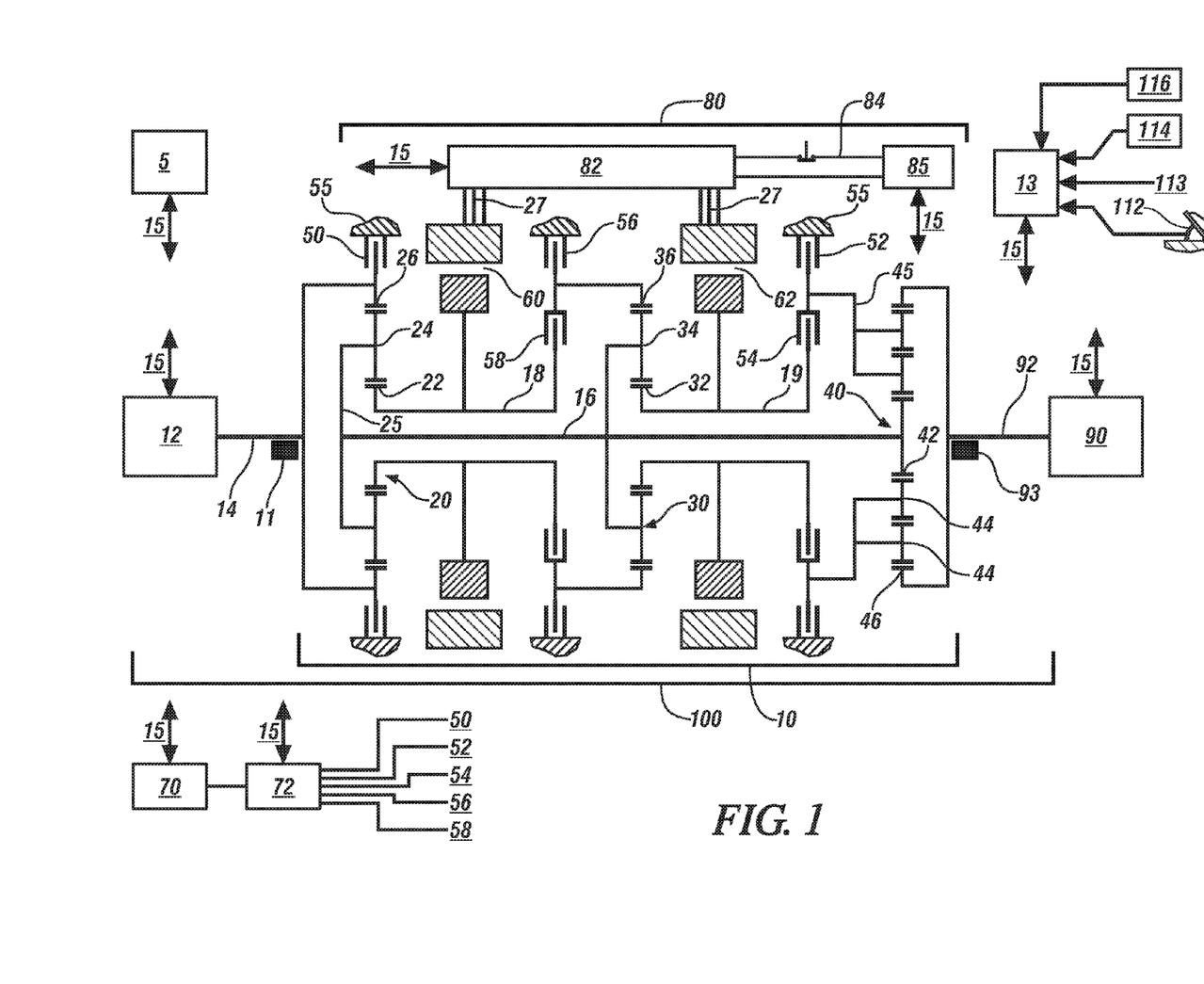
FIG. 1 illustrates an exemplary multi-mode powertrain system including an internal combustion engine, transmission, and a driveline configured with a rear-wheel drive differential, in accordance with the disclosure.

Referring now to the drawings, wherein the showings are for the purpose of illustrating certain exemplary embodiments only and not for the purpose of limiting the same, FIG. 1 depicts a non-limiting multi-mode powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators. The driveline 90 includes a differential system that facilitates a rear-wheel drive vehicle configuration.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/ or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60, 62.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to the first and second torque machines 60, 62. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member. The planet gears 34 are disposed in meshing relationship with both the sun gear member 32 and the ring gear member 36. The carrier member couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or another suitable device in this embodiment. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (battery) 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors (IGBTs) for converting DC power from the battery 85 to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system, and includes commanding an output torque request and selecting a transmission range. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector 114 can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, 25 and 100 milliseconds during ongoing engine and vehicle operation. Alternatively, routines may be executed in response to occurrence of an event.

The multi-mode powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning. When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of fixed gear (Gear #) ranges and variable ranges that are achieved by selectively activating the clutches C1 50, C2 52, C3 54, C4 56, and C5 58. The fixed gear ranges include those transmission ranges in which rotational speed of the output member 92 is directly proportional to rotational speed of the input member 14 due to gearing relationships between the interlocking gears of the planetary gear sets caused by activating specific ones of the aforementioned clutches. The variable ranges include those transmission ranges in which rotational speed of the output member 92 varies in relation to the input speed of the engine 12 and the rotational speeds of the first and second torque machines 60, 62. The variable ranges include electrically-variable mode (EVT Mode #), electric vehicle mode (EV#) and transitional and pseudo-gear modes (EV Transitional State # and Pseudo-gear #) and neutral (neutral). Table 1 depicts a plurality of transmission ranges and engine states for operating the multi-mode powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | x | | | |
| Neutral 3 | ON(ALL/DEAC/FCO)/OFF | | | | x | |
| Pseudo-gear 1 | ON(ALL/DEAC/FCO) | x | | | | |
| Pseudo-gear 2 | ON(ALL/DEAC/FCO) | | x | | | |
| Neutral | OFF | | | | | x |
| EVT Mode 1 | ON(ALL/DEAC/FCO)/OFF | x | x | | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | x | | | x |
| Gear 1 | ON(ALL/DEAC/FCO) | x | | | x | x |
| Gear 2 | ON(ALL/DEAC/FCO) | x | x | | x | |
| Gear 3 | ON(ALL/DEAC/FCO) | | | x | x | x |
| EV1 | OFF | x | | x | | x |
| EV2 | OFF | x | | | x | x |
| EV3 | OFF | | | x | x | x |
| EV4 | OFF | | | x | x | x |
| EV Transitional State 3 | OFF | x | x | | | x |
| Neutral | ON(ALL/DEAC/FCO)/OFF | | | | x | x |
| Pseudo-gear 3 | ON(ALL/DEAC/FCO) | x | x | | | |
| Neutral | OFF | | | x | | x |
| Neutral | OFF | | | | x | x |

Figure 2:
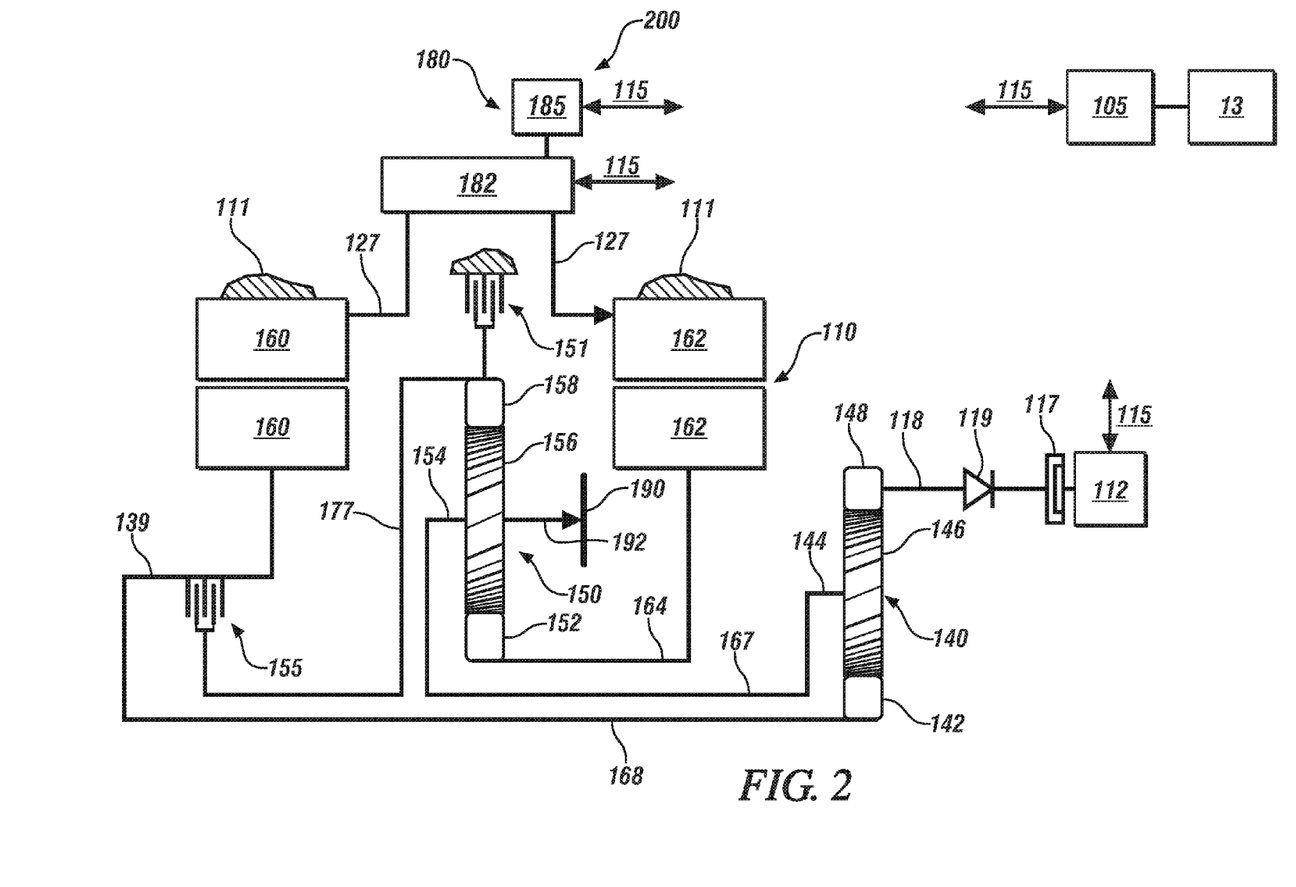
FIG. 2 illustrates an exemplary multi-mode powertrain system including an internal combustion engine, a multi-mode transmission, a high-voltage electrical system, and a driveline configured with a front-wheel drive transaxle, in accordance with the disclosure.

FIG. 2 shows a second embodiment of the multi-mode powertrain system, designated by 200 and including an internal combustion engine (engine) 112, a multi-mode transmission (transmission) 110, a high-voltage electrical system 180, a driveline 190, and a controller 105. The user interface 13 signally connects to the controller 105. The driveline 190 includes a transaxle system that facilitates a front-wheel drive vehicle configuration.

The multi-mode powertrain system 200 shares many features in common with the multi-mode powertrain system 100 described with reference to FIG. 1. The transmission 110 mechanically couples to the engine 112 and first and second torque machines 160 and 162, respectively, and is configured to transfer torque between the engine 112, the torque machines 160, 162, and the driveline 190. As illustrated, the first and second torque machines 160, 162 are electric motor/generators. The high-voltage electrical system 180 includes an electrical energy storage device, e.g., a high-voltage battery (battery) 185 electrically coupled to a transmission power inverter control module (TPIM) 182, and is configured with suitable devices for monitoring electric power flow including devices and systems for monitoring electric current and voltage. The TPIM 182 includes three-phase inverters configured to receive or supply DC electric power via DC transfer conductors and transform it to or from three-phase AC power, which is conducted to or from the first and second torque machines 160 and 162 for operation as motors or generators via transfer conductors 127.

The engine 112 may be any suitable combustion device that transfers torque to the transmission 110 via input member 118. In one embodiment, the configuration may include a mechanical diode 119 and/or a torque converter 117 between the engine 112 and the transmission 110. The mechanical diode 119 is a selectable one-way clutch in one embodiment. The mechanical diode 119 between the engine 112 and the transmission 110 permits the engine 112 to transfer torque to the transmission 110 in a first rotational direction and causes the input member 118 to free-wheel when spinning in a second, opposite rotational direction.

The illustrated transmission 110 is a two-mode, compound-split, electro-mechanical transmission 110 that includes two planetary-gear sets 140 and 150, and two engageable torque-transferring devices, i.e., clutches C1 151 and C2 155. Other embodiments of the transmission are contemplated. The planetary gear set 140 includes a sun gear member 142, a ring gear member 148, and planet gears 146 coupled to a carrier member 144. The carrier member 144 rotatably supports the planet gears 146 that are disposed in meshing relationship with both the sun gear member 142 and the ring gear member 148, and couples to rotatable shaft member 167. The input member 118 rotatably couples to the ring gear member 148. The sun gear 142 rotatably couples to shaft member 168. The planetary gear set 150 includes a sun gear member 152, a ring gear member 158, and planet gears 156 coupled to a carrier member 154. The planet gears 156 are disposed in meshing relationship with both the sun gear member 152 and the ring gear member 158. The carrier member 154 couples to the rotatable shaft member 167. The sun gear member 152 couples via shaft member 164 to a rotor of the second torque machine 162. The ring gear member 158 couples to the second clutch C2 155. The ring gear member 158 also couples to rotatable shaft member 177 that couples to one side of the first clutch C1 151. The second clutch C2 155 is a brake clutch that grounds the ring gear member 158 and the rotatable shaft member 177 to transmission ground 111. A second side of the first clutch C1 151 couples to a shaft member 139 that is rotatably coupled to shaft member 168 and also rotatably coupled to a rotor of the first electric machine 160. The output member 192 is rotatably connected to the driveline 190 to provide output power to the driveline 190 in the form of torque and rotational speed that is transferred to one or a plurality of vehicle wheels via a transaxle or another suitable device in this embodiment. The aforementioned controller 105 communicate with other control modules, sensors, and actuators via a communications link 115, which effects structured communication between the various control modules. The specific communication protocol is application-specific.

When the multi-mode powertrain 200 includes only the input member 118 between the engine 112 and the transmission 110, the multi-mode powertrain 200 is configured to operate in one of a plurality of powertrain states that are described with reference to Table 2. The powertrain states include a plurality of transmission ranges and engine states to generate and transfer torque to the driveline 190. The engine states include an ON state, an OFF state, and a fuel cutoff (FCO) state. The transmission ranges include fixed gear (Gear #) and variable ranges that are achieved by selectively activating the first and second clutches C1 151 and C2 155. The fixed gear ranges includes those transmission ranges in which rotational speed of the output member 192 is directly proportional to rotational speed of the input member 118 due to gearing relationships between the interlocking gears of the planetary gear sets caused by activating specific ones of the aforementioned clutches. The variable ranges include those transmission ranges in which rotational speed of the output member 192 varies in relation to the input speed of the engine 112 and the rotational speeds of the first and second torque machines 160, 162. The variable ranges include electrically-variable mode (EVT Mode #), electric vehicle mode (EV#) and pseudo-gear ranges (Pseudo-gear #) and neutral (neutral). Table 2 depicts a plurality of transmission ranges and engine states for operating the multi-mode powertrain 200.

TABLE 2

| Range | Engine State | C1 | C2 |
|---|---|---|---|
| Neutral 1 | ON(ALL/DEAC/FCO)/OFF | | |
| Pseudo-gear 1 | ON(ALL/DEAC/FCO) | | |
| EVT Mode 1 | ON(ALL/DEAC/FCO) | x | |
| EVT Mode 2 | ON(ALL/DEAC/FCO) | | x |
| EV Mode 1 | OFF | x | |
| EV Mode 2 | OFF | | x |
| Gear 1 | ON(ALL/DEAC/FCO) | x | x |

When the multi-mode powertrain 200 includes the input member 118 and the mechanical diode 119 between the engine 112 and the transmission 110, the multi-mode powertrain 200 is configured to operate in one of a plurality of powertrain states that are described with reference to Table 3. The powertrain states include a plurality of transmission ranges and engine states to generate and transfer torque to the driveline 190. The engine states include an ON state, an OFF state, and a fuel cutoff (FCO) state.

The transmission ranges include fixed gear (Gear #) and variable ranges that are achieved by selectively activating the first and second clutches C1 151 and C2 155, as previously described, and the mechanical diode 119, which is designated as clutch C3.

TABLE 3

| Range | Engine State | C1 | C2 | C3 |
|---|---|---|---|---|
| Neutral 1 | ON(ALL/DEAC/FCO)/OFF | | | |
| Pseudo-gear 1 | ON(ALL/DEAC/FCO) | | | |
| EVT Mode 1 | ON(ALL/DEAC/FCO) | x | | |
| EVT Mode 2 | ON(ALL/DEAC/FCO) | | x | |
| Neutral 2 | OFF | | | x |
| Gear 1 | ON(ALL/DEAC/FCO) | x | x | |
| EV1 | OFF | x | | x |
| EV2 | OFF | | x | x |

The multi-mode powertrain system can operate in one of the pseudo-gear ranges to transmit torque to the driveline during ongoing operation. Operating an embodiment of the multi-mode powertrain system in one of the pseudo-gear ranges includes operating the multi-mode transmission in one of the variable ranges described with reference to one of Tables 1, 2, and 3 and controlling magnitude of torque output from the transmission to the driveline so that it is directly proportional to magnitude of the engine input torque, taking into account torque losses associated with torque-consuming components on the input member. A pseudo-gear range can be employed as an intermediate transmission range during shifts between EVT Mode ranges, and can also be employed during steady-state transmission operation.

Operating the multi-mode powertrain system in a pseudo-gear range includes operating with three degrees of freedom with regard to transmission speeds. The three degrees of freedom with regard to speed preferably include the input speed, the output speed, and clutch speed of a selected one of the clutches.

The clutch(es) are activated as described with reference to one of Tables 1, 2, or 3 (corresponding to the powertrain configuration) and operation of the first and second torque machines 60, 62 are controlled in accordance with the following torque balancing equation:

$$\begin{bmatrix} Ta \\ Tb \\ To \\ Tc \end{bmatrix} = \begin{bmatrix} A1 \\ A2 \\ A3 \\ A4 \end{bmatrix} [Te] + [Bn] * \begin{bmatrix} Nidot \\ Ncdot \\ Nodot \\ Tc\_n \\ Ni \\ Nc\_n \\ No \end{bmatrix} \quad [1]$$

wherein
Te is a torque command for the engine,
Ta is a torque command for the first torque machine,
Tb is a torque command for the second torque machine,
To is the output torque request,
Tc is clutch torque for one of the clutches,
A1, A2, A3, and A4 are scalar values (with A3 being a non-zero scalar value when operating in one of the pseudo-gear ranges),
Bn is a matrix of application-specific scalar values associated with gearing ratios,
Nidot is time-rate change in input speed,
Ncdot is a time-rate change in the clutch speed,
Nodot is a time-rate change in the output speed,
Tc_n indicates clutch speeds for the non-activated clutches,
Ni is input speed,
Nc_n is clutch speeds of the non-activated clutches, and
No is output speed.

When the powertrain configuration is the multi-mode transmission 10 described with reference to FIG. 1, Tc, Nc, and Ncdot refer to clutch torque, clutch speed, and time-rate change in the clutch speed for clutch C3 56. When the powertrain configuration is the multi-mode transmission 110 described with reference to FIG. 2, Tc, Nc, and Ncdot refer to clutch torque, clutch speed, and time-rate change in the clutch speed for clutch C1 151. EQ. 1 may also be employed to characterize operation in one of the Neutral ranges by setting the A3 term equal to zero.

Figure 3:
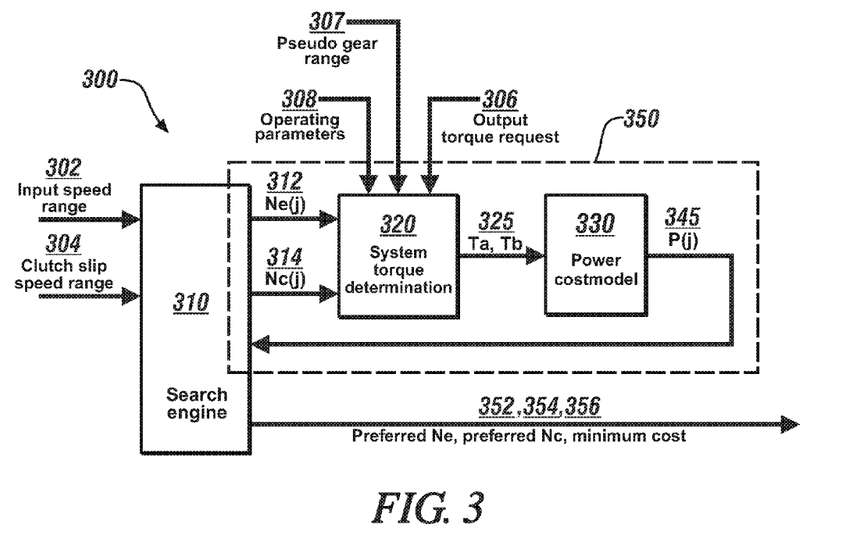
FIG. 3 illustrates a search scheme for determining a preferred engine speed and a preferred clutch slip speed when operating a multi-mode powertrain system in one of the pseudo-gear transmission ranges in response to an output torque request, in accordance with the disclosure.

FIG. 3 schematically shows a pseudo-gear search scheme 300 for determining a preferred engine speed 352 and a preferred clutch slip speed 354 within a predetermined input speed range 302 and clutch slip speed range 304 when operating an embodiment of the multi-mode powertrain system in one of the pseudo-gear ranges 307 in response to an output torque request 306. When operating the engine in the all-cylinder state, the input speed range 302 traverses from engine idle speed, e.g., 800-1000 RPM, to a maximum achievable engine speed, i.e., redline. The maximum achievable engine speed is specific to an engine configuration and can be in the range of 5000 RPM to 8000 RPM. When operating the engine in the cylinder deactivation state, the input speed range 302 traverses between a minimum speed, e.g., 1000 RPM, and a threshold maximum cylinder deactivation engine speed, which is less than the maximum achievable engine speed in the all-cylinder state, and is specific to an engine configuration. As shown, the threshold cylinder deactivation engine speed is 3000 RPM. The clutch slip speed range 304 traverses between a zero slip speed and a maximum allowable slip speed.

The pseudo-gear search scheme 300 determines the preferred input speed 352 and the preferred clutch slip speed 354 to achieve the output torque request 306 while operating in the pseudo-gear range 307 based upon a minimum of a plurality of candidate costs 345. The input speed range 302 and clutch slip speed range 304 are provided to the two-dimensional search engine (search engine) 310. The search engine 310 iteratively generates candidate engine speeds Ne(j) 312 across the input speed range 302 and candidate clutch slip speeds Nc(j) 314 across the slip speed range 304, each which is input to an iteration loop 350. The designation (j) indicates an individual iteration. The iteration loop 350 employs a system torque determination scheme 320, and a cost model 330 to calculate a candidate cost Pcost(j) 345 for each candidate engine speed Ne(j) 312 and each candidate clutch slip speed Nc(j) 314. The search engine 310 monitors the candidate costs Pcost(j) 345 for all iterations. The candidate engine speed Ne(j) 312 and candidate clutch slip speed Nc(j) 314 that achieve a minimum of the candidate costs Pcost(j) 345 responsive to the output torque request are selected by the search engine 310 as the preferred engine speed 352 and preferred clutch slip speed 354. The minimum cost 356 and corresponding preferred engine speed 352 and preferred clutch slip speed 354 are identified based upon execution of a plurality of iteration loops across the input speed range 302 and clutch slip speed range 304.

The system torque determination scheme 320 executes EQ. 1 to determine a candidate powertrain operating point 325, including preferred motor torque commands Ta, Tb for the first and second torque machines to achieve the output torque request To 306 in response to the candidate engine speed Ne(j) 312 and the candidate clutch slip speed Nc(j) 314 when operating in the selected pseudo-gear range 307 and based upon powertrain system operating parameters 308. The powertrain system operating parameters 308 include operating limits for the first and second torque machines, e.g., minimum and maximum torques and minimum and maximum speeds, and operating limits for the battery, e.g., battery power limits including maximum discharge limits and maximum charge limits. The candidate powertrain operating point 325 includes preferred operating parameters for the first and second torque machines, e.g., torques and speeds, and preferred operating parameters for the battery, e.g., battery power, in response to the output torque request 306 when the engine is operating at the candidate engine speed Ne(j) 312 at the candidate clutch slip speed Nc(j) 314 and the transmission is operating in the selected pseudo-gear range 307.

The cost model 330 includes a power cost function that determines a candidate cost P(j) 345 for operating the powertrain at the candidate powertrain operating point 325. An exemplary power cost function is described with reference to FIG. 4.

The search engine 310 selects the preferred engine speed 352 and preferred clutch slip speed 354 based upon the candidate power costs P(j) 345 for all the candidate engine speeds Ne(j) 312 and candidate clutch slip speeds Nc(j) 314. The preferred engine speed 352 and clutch slip speed 354 are the candidate engine speed Ne(j) 312 and the candidate clutch slip speed Nc(j) 314 that result in a minimum of the candidate power costs P(j) 345 for operating the multi-mode powertrain system in the selected pseudo-gear range 307 in response to the output torque request 306. The multi-mode powertrain system employs the pseudo-gear search scheme 300 to control operation in the selected pseudo-gear range 307 at the preferred engine speed 352 and preferred clutch slip speed 354 in response to the output torque request 306.

Figure 5:
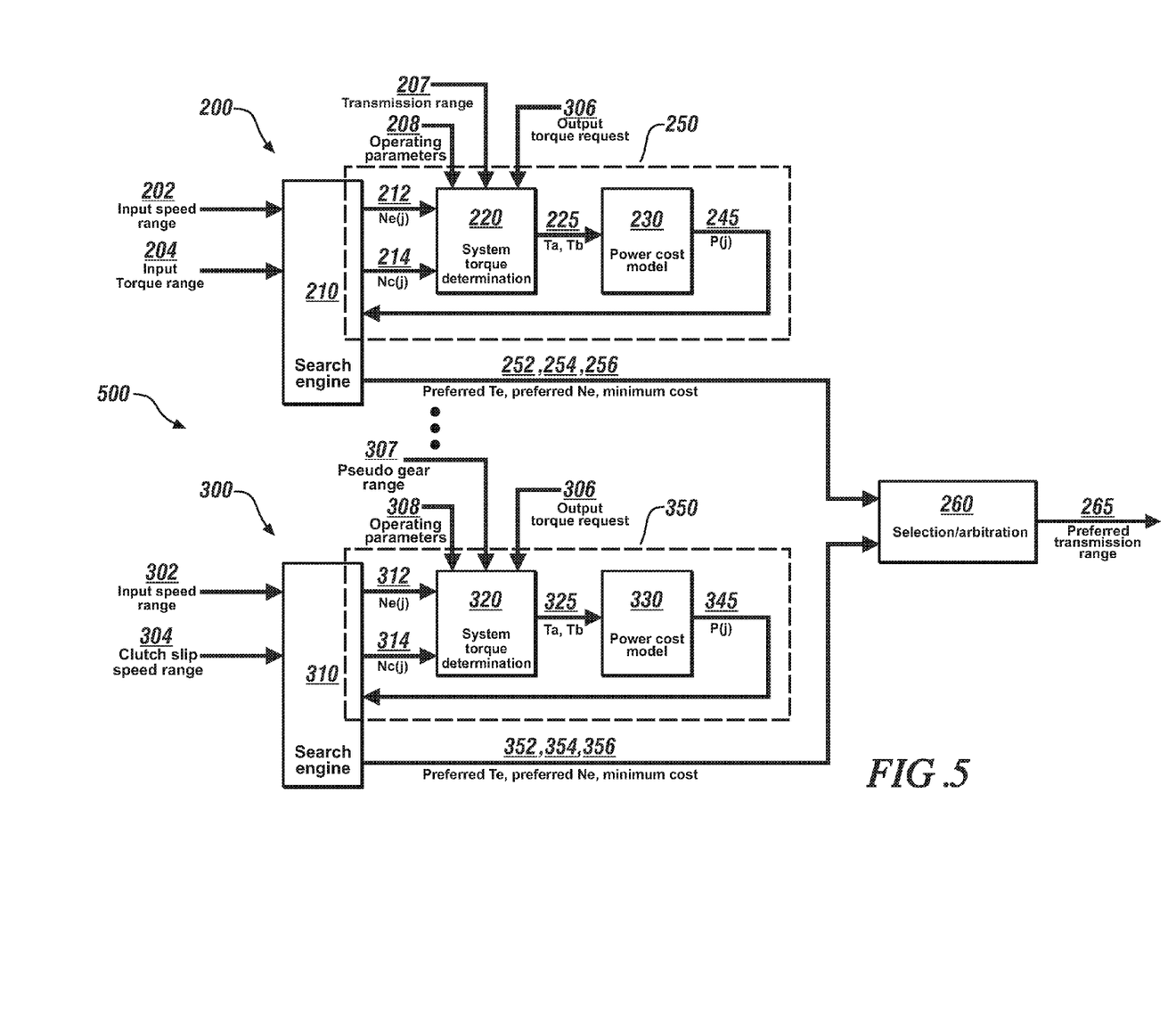
FIG. 5 illustrates a transmission range selection scheme including a plurality of search schemes and at least one pseudo-gear search scheme, in accordance with the disclosure.

FIG. 5 schematically shows a transmission range selection scheme 500 including a plurality of search schemes 200 . . . and at least one pseudo-gear search scheme 300, which is described with reference to FIG. 3. There may be more than one of the pseudo-gear search schemes 300 on systems having multiple pseudo-gear ranges, e.g., as described with reference to Table 1. Each of the search schemes 200 . . . employs a search engine 210 to search within a predetermined speed/torque search window that defines an input speed range 202 and an input torque range 204 while operating the powertrain system with the transmission operating in one of the candidate transmission ranges 207 in response to the output torque request 306. The pseudo-gear search scheme 300 employs search engine 310 to search with an input speed range 302 and clutch slip speed range 304 while operating the powertrain system with the transmission operating in one of the candidate pseudo-gear ranges 307 in response to the output torque request 306. Exemplary candidate transmission ranges 207 and candidate pseudo-gear ranges 307 are described with reference to Tables 1, 2 and 3.

The transmission range selection scheme 500 selects a candidate transmission range based upon a minimum of the power costs 256, . . . 356 for each of the candidate transmission ranges when operating the powertrain system 100 in response to the output torque request 306 and output speed, as shown. The search schemes 200, . . . and the pseudo-gear search scheme 300 are preferably executed simultaneously, i.e., within the same loop cycle. One of the search schemes 200 is shown, but it is appreciated that the quantity of search schemes can be any suitable number consistent with the quantity of available transmission ranges. A selection/arbitration scheme 260 identifies one of the candidate transmission ranges 207 or one of the pseudo-gear ranges 307 as a preferred transmission range 265, and controls operation of the powertrain system 100 in response.

The input speed range 202 and torque range 204 are provided to the two-dimensional search engine (search engine) 210. The search engine 210 iteratively generates a plurality of candidate engine speeds Ne(j) 212 across the input speed range 302 and a plurality of candidate engine torques 204 Te(j) 214, each which is input to an iteration loop 250. The designation (j) indicates an individual iteration. The iteration loop 250 employs a system torque determination scheme 220, and a cost model 230 to calculate a candidate power cost Pcost(j) 245 for each candidate engine speed Ne(j) 212 and each candidate engine torque Te(j) 214.

The search engine 210 monitors the candidate power costs Pcost(j) 245 for all iterations. The candidate engine speed Ne(j) 212 and candidate engine torque Te(j) 214 that achieve a minimum of the candidate power costs Pcost(j) 245 are selected by the search engine 210 as the preferred engine speed 252 and preferred clutch slip speed 254. The minimum cost 256 and corresponding preferred engine speed 252 and preferred engine torque 254 are identified based upon execution of a plurality of iteration loops across the input speed range 202 and engine torque range 204.

The system torque determination scheme 220 determines a candidate powertrain operating point 225, including motor torque commands Ta, Tb for the first and second torque machines to achieve the output torque request To 306 in response to the candidate engine speed Ne(j) 212 and the candidate engine torque Te(j) 214 when operating in the selected transmission range 207 and based upon powertrain system operating parameters 308. The powertrain system operating parameters 308 include operating limits for the first and second torque machines, e.g., minimum and maximum torques and minimum and maximum speeds, and operating limits for the battery, e.g., battery power limits including maximum discharge limits and maximum charge limits. The candidate powertrain operating point 225 includes preferred operating parameters for the first and second torque machines, e.g., torque and speed, and preferred operating parameters for the battery, e.g., battery power, in response to the output torque request 306 when the engine is operating at the candidate engine speed Ne(j) 212 and the candidate engine torque Te(j) 214 and the transmission is operating in the selected transmission range 207.

The cost model 230 determines a candidate power cost P(j) 245 for operating the powertrain at the candidate powertrain operating point 225. An exemplary power cost function is described with reference to FIG. 4.

The search scheme 200 determines a minimum power cost 256 and a corresponding preferred engine speed 252 and preferred engine torque output 254 when operating the powertrain system 100 in response to the output torque request 306 with the transmission 10 in the candidate transmission range 207.

The aforementioned minimum power costs 256, . . . 356 associated with the candidate transmission ranges 207, . . . and candidate pseudo-gear range(s) 307 are input to the selection/arbitration block 260, which acts to select the candidate transmission range 207 or candidate pseudo-gear range(s) 307 having a minimum of the minimum power costs 256, . . . 356 as a preferred transmission range 265 for controlling the transmission 10 with engine operation controlled employing the corresponding speed 252 and torque 254 or corresponding preferred engine speed 352 and a preferred clutch slip speed 354. The selection/arbitration block 260 employs hysteresis and other tactics to minimize shift busyness. The preferred engine speed 252 and preferred engine torque 254 can be employed to control operation of the engine 12 in the selected transmission range 207, with operation of the powertrain system 100 corresponding thereto.

Figure 4:
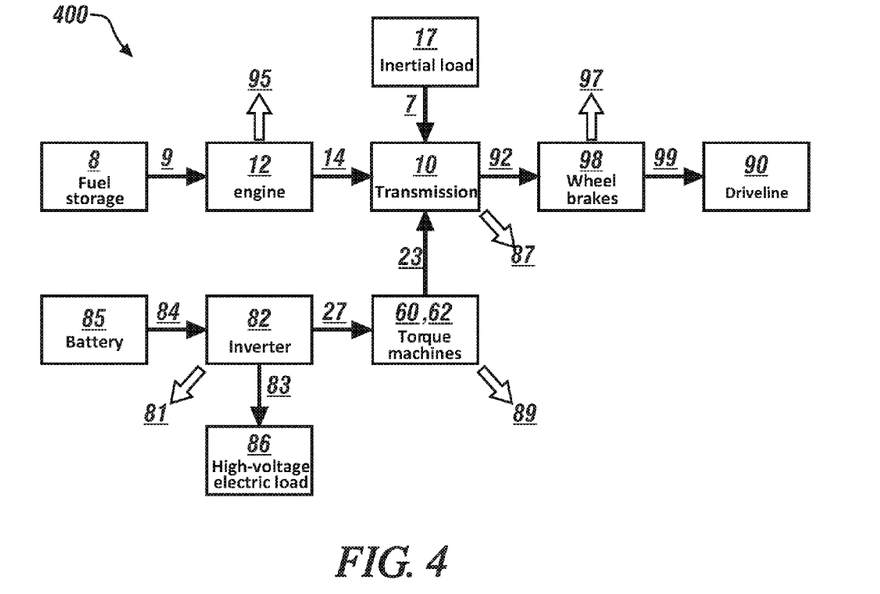
FIG. 4 illustrates a power cost determination function including an analytic framework for determining powertrain system operating costs, in accordance with the disclosure.

FIG. 4 schematically illustrates an exemplary power cost function 400 including an analytic framework for determining powertrain system operating costs, which is described with reference to the multi-mode powertrain system 100 described with reference to FIG. 1. Powertrain elements include engine 12, transmission 10, non-combustion torque machines 60, 62, battery 85, inverter 82, wheel brakes 98, driveline 90, and a fuel storage system 8. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 to the driveline 90. Power losses include engine power losses 95, battery power losses 81, mechanical power losses 87, electric motor losses 89, and brake power losses 97. The power cost inputs to the power cost function 400 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 10 and the non-combustion torque machines 60, 62. The power cost function 400 may be employed to determine a total power cost for operating at a selected engine operating point while operating the powertrain system responsive to an output torque request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machine, and a driveline, the method comprising:
    controlling operation of the powertrain system in a pseudo-gear range in response to an output torque request including operating the transmission in a variable mode transmission range and controlling a magnitude of torque output to the driveline in response to an output torque request and in proportion to a magnitude of input torque from the engine;
    wherein controlling operation in a pseudo-gear range further comprises determining a preferred engine speed and a preferred clutch slip speed for a torque transfer clutch of the transmission in response to the output torque request.

2. The method of claim 1, wherein determining the preferred engine speed and the preferred clutch slip speed for a torque transfer clutch of the transmission comprises:
    for each of a plurality of candidate engine speeds and candidate clutch slip speeds, employing a system torque determination scheme for operating the powertrain system in the pseudo-gear range in response to the output torque request, and employing a cost model to calculate a respective candidate cost; and
    identifying the preferred engine speed and the preferred clutch slip speed comprising the candidate engine speed and the candidate clutch slip speed associated with a minimum of the candidate costs.

3. The method of claim 2, wherein employing the system torque determination scheme for operating the powertrain system in the pseudo-gear range comprises determining a preferred powertrain operating point including motor torque commands for the torque machines to achieve the output torque request in response to the candidate engine speed and the candidate clutch slip speed when operating in the pseudo-gear range based upon powertrain system operating parameters.

4. The method of claim 3, wherein employing the cost model to calculate the respective candidate cost comprises:
    employing the system torque determination scheme for operating the powertrain system in the pseudo-gear range in response to the output torque request to determine an optimized candidate powertrain operating point; and
    employing a power cost function to determine a candidate cost for operating the powertrain at the optimized candidate powertrain operating point.

* * * * *